(12) United States Patent
Smith et al.

(10) Patent No.: US 7,986,510 B1
(45) Date of Patent: Jul. 26, 2011

(54) CARBON ELECTRODES AND ELECTROCHEMICAL CAPACITORS

(76) Inventors: W. Novis Smith, Philadelphia, PA (US); Joel R. McCloskey, Philadelphia, PA (US); James J. Gormley, Ardsley, PA (US)

(*) Notice: Subject to any disclaimer, the term of this patent is extended or adjusted under 35 U.S.C. 154(b) by 250 days.

(21) Appl. No.: 12/455,239

(22) Filed: May 30, 2009

Related U.S. Application Data (63) Continuation-in-part of application No. 12/287,867, filed on Oct. 14, 2008.

(51) Int. Cl.
*H01G 9/00* (2006.01)

(52) U.S. Cl. ........ 361/502; 361/503; 361/504; 361/512; 361/523; 361/525; 29/25.01; 29/25.03; 252/62.2

(58) Field of Classification Search ........... 361/502, 361/503–504, 509–512, 516–519, 523–525, 361/528–529, 540–541; 29/25.01, 25.03; 252/62.2
See application file for complete search history.

(56) References Cited

U.S. PATENT DOCUMENTS

| | | | | |
|---|---|---|---|---|
| 6,265,106 | B1* | 7/2001 | Gan et al. | 429/215 |
| 6,426,863 | B1* | 7/2002 | Munshi | 361/503 |
| 6,862,167 | B1* | 3/2005 | Banno et al. | 361/502 |
| 6,902,684 | B1* | 6/2005 | Smith et al. | 252/62.2 |
| 7,292,431 | B2* | 11/2007 | Timonov et al. | 361/502 |
| 7,411,777 | B2* | 8/2008 | Chiba | 361/502 |
| 7,430,108 | B2* | 9/2008 | Ozawa et al. | 361/523 |
| 7,436,651 | B2* | 10/2008 | Takeda et al. | 361/502 |

* cited by examiner

*Primary Examiner* — Nguyen T Ha
(74) *Attorney, Agent, or Firm* — John Lezdey (57) ABSTRACT

An electrochemical device having an operational voltage up to 4.5 V in combination with a high concentration of an electrolyte salt consisting of a tetrafluoroborate salt and a eutectic of two solvents in which ethylene carbonate is one and an improved carbon electrode a preferred electrochemical device is a capacitor.

17 Claims, 7 Drawing Sheets

CARBON ELECTRODES AND ELECTROCHEMICAL CAPACITORS

RELATED APPLICATION

This application is a continuation-in-part of application Ser. No. 12/287,867 filed Oct. 14, 2008.

FIELD OF THE INVENTION

The present invention relates to conditioned carbon for electrodes and electrochemical capacitors containing the electrodes. More particularly, there is provided a synergistic improvement when a capacitor utilizes a conditioned carbon for electrodes of the invention in combination with a non-aqueous non-nitrile solvent having a high concentration of an electrolyte salt which is a quaternary tetrafluoroborate salt in a eutectic mixture with ethylene carbonate as one of the solvents.

BACKGROUND OF THE INVENTION

Activated carbon is the preferred material for use in preparing electrodes for carbon electrode capacitors. This activated carbon is prepared from a number of different sources such as coconut shells, wood, sugar, cellulosics and phenolic resins. After converting these materials to carbon under steam controlled conditions, the carbons are "activated" in a second step using steam or catalyzed with KOH, NaOH and/or carbon dioxide and KOH to increase the surface area to very high surface areas such as 1000 to 2400 $m^2/g$. These activated carbons usually contain about 2% oxygen after they have been thoroughly dried and traces of inorganic salts. This oxygen is probably present as quinones, hydroquinones, esters, phenols, carboxylic acids, furans and possibly ketones etc. with some nitrogen compounds present—all of which under higher voltage conditions greater than 3 V. will undergo electrochemical oxidation/reduction as the voltage is increased past 3.3 V. At lower voltages, these functional groups actually improve the energy storage capacity of the carbon and are desirable at voltages below 3.2 V.

The basic components of electrical capacitors include conductive electrodes connected to an electric power supply and a dielectric material separating the electrodes. Electrolytic capacitors and electrochemical double layer capacitors also have an electrolyte. In an electrolytic capacitor, the electrodes are provided by an oxide or carbon layer formed on metal foil and separated by a porous non conducting membrane such as paper, porous polymer, etc. The liquid electrolyte provides electrical contact to the opposite electrode through the separator. The inherently high resistance of electrolytic capacitors is generally mitigated by rolling a large sheet of the electrode material into a roll to give high surface area. In an electrochemical double layer capacitor, the dielectric is provided by the electrolyte. In this type of capacitor, the resistance of the electrolyte is a significant factor in the total device resistance. In capacitors that use electrolytes, the temperature has a major influence on the electrolyte in the performance of the capacitor since the conductivity of the electrolyte decreases with temperature.

Electrochemical double layer capacitors, including super capacitors, typically comprise electrodes, electrical contacts to a power supply, separators for electrodes and/or cells, an electrolyte and environmental seals. As mentioned above, a key component of electrolytic and electrochemical double layer capacitors is the electrolyte, which typically comprises a combination of a conductive salt and a solvent. Desirable electrolytes are typically liquid with low viscosity, low density, and high conductivity over a range of ambient temperature conditions. They should also be commercially inexpensive, chemically and electrochemically stable, and compatible with carbon. Aqueous electrolyte systems have been used extensively and provide voltage restricted below 1.8v. However, some electrolyte liquid systems are less effective in providing higher energy densities at lower temperatures. The current non-aqueous aprotic solvent used for ultra capacitor electrolytes is acetonitrile which is toxic, highly flammable and has a voltage limit of 2.7v. For example, ultra capacitors in Japan are not permitted to use acetonitrile for the electrolyte. A need exists for improved electrolyte systems that provide optimum capacitance for capacitors to achieve high power density, a wide temperature range, and a long lifetime without memory effects.

The key requirements for the electrolyte in both non-aqueous batteries and capacitors are high voltage stability, low temperature performance and electrochemical stability. U.S. Pat. No. 6,743,947 to Xu et al discloses an electrolyte system comprising a mixture of ethylene carbonate and dimethyl carbonate at a concentration of the salt at 0.5-2.5 M which has poor conductivity at low temperatures.

U.S. Pat. No. 5,418,682 to Warren et al, which is herein incorporated by reference discloses a method of preparing tetraalkyl ammonium tetrafluoroborate salts for use as electrolytes with dinitrile mixtures as solvents.

U.S. Pat. No. 5,965,054 to McEwen et al, which is herein incorporated by reference discloses non-aqueous electrolytes for electrical storage devices utilizing salts consisting of alkyl substituted, cyclic delocalized aromatic cations and their perfluoro derivatives with alkyl carbonate solvents.

U.S. Pat. No. 6,902,683 to Smith et al, which is herein incorporated by reference relates to electrolytes of a complex salt formed by mixing of a tetraalkyl ammonium salt of hydrogen fluoride with an imidazolium compound in a nitrile solvent which operate at temperatures between −60 and 150° C.

The article of Ue in *J. electrochem. Soc*. Vol 141, No. 11, November 1994 entitled "*Electrochemical Properties of Organic Liquid Electrolytes Based on Quaternary Onium Salts for Electrical Double-Layer Capacitors*" which is herein incorporated by reference, discloses high permittivity solvents and onium salts for double-layer capacitors. Specifically studied were quaternary onium tetrafluoroborate salts which showed greater solubility in the solvents with good stability and conductivity.

SUMMARY OF THE INVENTION

According to one object of the invention there is provided high voltage electrochemical double layer capacitors (EDLC) having an operating voltage up to at least 4.1 volts over a wide temperature range. The object of the invention is achieved by the use of conductive carbon electrodes in combination with an electrolyte comprising quaternary ammonium salts and a eutectic mixture of aprotic non-nitrile solvents.

The carbon electrodes are prepared in discs formed with carbon particles which have been heat treated between 850° C. and 1300° C., preferably about 1050° C. to 1190° C. in an inert atmosphere or vacuum for about 30 to 60 minutes. This carbon can be formed into 4 mm sheets with a polymeric binder and then cut into electrode form.

In accordance with another feature of the invention the electrolyte of the EDLC comprises an aprotic non-nitrile non-aqueous solvent and at least one tetraalkyl ammonium tetrafluoroborate salt in a higher concentration (2.0 to 4.0 M; 20-55% by weight).

Advantageously, an aluminum metal collector is used with the capacitor electrode.

It is a general object of the invention to provide an EDLC having an operating voltage up to 4.0-4.5 V.

It is a general object of the invention to prepare a capacitor which contains electrodes comprised of post treated activated carbon particles which do not contain ash, silica or functional oxygen or sulfur compounds in combination with specific electrolytes.

It is another object of the invention to provide a capacitor with a carbon electrode which operates at higher voltage (>3.0 to 4.5 V).

The invention will become better understood from a reading of the preferred embodiment of the invention and the drawings.

DESCRIPTION OF THE PREFERRED EMBODIMENTS

According to the present invention there is provided an improved electrochemical carbon electrode double layer capacitor (EDLC) which has electrochemical stable carbon electrodes with an electrolyte having a conductivity of about 20-30 mS/cm at 25° C. and rises to 65 mS/cm at about 80° C. which comprises a non-aqueous, non-nitrile electrolyte and at least one conductive ammonium tetrafluoroborate salt selected from the group consisting of a compound of the general formula:

wherein $R_1$, $R_2$, $R_3$, $R_4$ are the same or different and consist of an alkyl group having 1 to 4 carbon atoms, $R_5$ and $R_6$ are hydrogen, methyl or ethyl, and a solvent comprising a eutectic mixture of ethylene carbonate and at least one member of the group consisting of methyl acetate, propylene carbonate, dimethyl carbonate, ethylmethyl carbonate, diethyl carbonate, gamma butyrolactone, 1,2-dimethoxy ethane, diethylene glycol dimethyl ether, methyl formate, and triethylene glycol dimethyl ether, and/or the salts, said salt(s) being in a concentration of at least 1.5M to 4.5 M and said solvent comprising about 10 to 70% by weight ethylene carbonate.

The preferred tetralkylammonium tetrafluoroborates includes methyltriethyl ammonium tetrafluoroborate, diethyl dimethylammonium tetrafluoroborate, and ethyltrimethylammonium tetrafluoroborate.

The preferred N,N-alkylpyrrolidinyl tetrafluoroborates include N,N-ethylmethyl pyrrolidinyl tetrafluoroborate, N,N-dimethylpyrrolidinyl tetrafluoroborate, N,N-diethyl pyrrolidinyl tetrafluoroborate, N,N-dimethyl-2-methylpyrrolidinyl tetrafluoroborate, and N,N-dimethyl-3-methylpyrrolidinyl tetrafluoroborate.

Spiro pyrrolidinyl pyrrolidinyl tetrafluoroborate has also been demonstrated to be effective in the eutectic solvent as a conductive salt.

For a maximum conductivity in the ester and organic solvents and their mixtures, it is important to keep the molecular weights of the tetrafluoroborate salts as low as possible, preferably, below 232. Although other anions can be used, the tetrafluoroborates are preferred for their better conductivity, higher solubility, and higher cyclic voltage stability.

In order to attain the maximum energy density storage in the charged double layer capacitor of the invention, it is important to achieve the maximum practical charging/discharging voltage. This is only achievable when both the electrolyte and the conducting quaternary ammonium salt also have a high voltage stability. Acetonitrile as an electrolyte solvent limits the capacitor voltage to about 2.7 V because of the problems with stability above this voltage although it gives the highest conductivities of any electrolyte solvent. In addition to its voltage limitation, acetonitrile is highly flammable and considered toxic in many published world wide regulations.

It has been found that the viscosity of these electrolytes is lowered with the substitution of a portion (5-15%) of the solvating co-solvents with a very low viscosity, low molecular weight, stable, solvating esters and ethers, such as methyl acetate, methyl formate, ethyl formate, ethyl acetate, and ethylene glycol dimethyl ether. The result is a further enhancement of the conductivity of these electrolytes with a further increase of about 2 mS/cm (about 6-7% increase) and very significant low temperature performance down to −50° C. There is a significant lowering in the flash point, but it still remains significantly above that for acetonitrile (5° C.) and the electrolyte remains non-toxic.

A preferred solvent comprises the combination of ethylene carbonate (EC) and propylene carbonate (PC) wherein ethylene carbonate comprises 30 to 70% by weight. The invention provides at least a 45% improvement in conductivity over the current non-nitrile aprotic electrolytes for ultra capacitors and nearly 60% of the conductivity for current acetonitrile based ultra capacitor electrolytes. These improvements are seen more significant for these electrolytes because the ionic salt content is more than twice as much as the current electrolytes which results in even better efficiency in charge/discharge capacitance than implied from the conductivity values alone. The use of these select solvents permits higher voltage which increases the overall energy capacity of the capacitor.

It was found that ethylene carbonate (EC) was essential to achieve significant improvement in conductivity over the current non-nitrile aprotic electrolytes. The problem with EC is that it has a melting point about 36° C. and readily precipitates out of the solution on cooling to low temperatures. Thus EC based electrolytes which have satisfactory low temperature performance down to −20° C. cannot contain significant amounts of EC alone. However, we have found that eutectic mixture containing only EC and one other selected solvent and these salts can be made which functions very well down to 10° C. and has high boiling point and temperature, stability slightly over 250°.

In order to attain the maximum energy density storage in the charged double layer capacitor of the invention, it is important to achieve the maximum practical charging/discharging voltage. This is only achievable when both the electrolyte and the conducting quaternary ammonium salt also have a high voltage stability. Acetonitrile as an electrolyte solvent limits the capacitor voltage to about 2.7 V because of the problems with stability above this voltage although it gives the highest conductivities of any electrolyte solvent. In addition to its voltage limitation, acetonitrile is highly flammable and considered toxic in many published world wide regulations.

The viscosity of these electrolytes is lowered with the substitution of a portion (5-15%) of the solvating co-solvents with very low viscosity, low molecular weight, stable, solvating esters and ethers, such as methyl acetate, methyl formate, ethyl formate, ethyl acetate, and ethylene glycol dimethyl ether. The result is a further enhancement of the conductivity of these electrolytes with a further increase of about 2 mS/cm (about 6-7% increase) and very significant low temperature performance down to −50° C. There is a significant lowering in the flash point, but it still remains significantly above that for acetonitrile (5° C.) and the electrolyte remains non-toxic.

The addition of propylene carbonate (PC) or gamma butyrolactone (GBL) with ethylene carbonate (EC) in the mixture maximizes the conductivity of these electrolyte formulations and also results in excellent low temperature performance down to −40° C. These mixtures also have the distinct advantage of not being essentially flammable with the use of these high boiling solvents (bp>208° C.) and the high percentage of the quaternary salts (>20% by weight).

For maximum capacitor and better low temperature performance, the less viscous solvents such as DME, EMC, DMC, are mixed with the EC. Optionally, small amounts (up to 10%) of methyl acetate, ethyl acetate, or methyl formate may also be used to lower viscosity and use at low temperatures.

These novel electrolytes have conductivities which range from 20 to 30 mS/cm which is about 50% of the conductivities found with the currently used acetonitrile electrolytes (52-56 mS/cm) which are at about 0.8-1.2 M and contain tetra-ethylammonium tetrafluoroborate. Therefore when the operating voltage for the capacitor with the novel electrodes is increased from 2.5 V (current) to 4.1 V the increase in energy density is increased about 67% if the conductivities of the two electrolytes limitation were the same (2.7 V maximum).

We have found that in a test capacitor with the post treated carbon or cabot Bp 2000 carbon, the capacitance of these cells at 2.5 V is the same whether using the current acetonitrile electrolyte (1.0 M tetraethylammonium tetrafluoroborate) or using 2.5 M diethyldimethyl tetrafluoroborate in EC/PC. Since the energy density of a capacitor is equal to ½ capacitance X (voltage)$^2$.

It is also a major advantage to increase the operating voltage for a capacity in that you can reduce the number of capacitors required in series to achieve a required voltage. Since energy is a function of the voltage the increase of the resultant voltage range is a dramatic improvement. This is both a cost reduction, and a saving in space and weight.

These novel electrolytes have conductivities which range from 20 to 30 mS/cm which is about 50% of the conductivities found with the currently used acetonitrile electrolytes (52-56 mS/cm) which are at about 0.8-1.2 M and contain tetra-ethylammonium tetrafluoroborate. However when the use voltage for the capacitor with the novel electrodes is increased from 2.5 V (currently) to 4.1 V the increase in energy density is increased about 67% if the conductivities of the two electrolytes were the same. The ratio of the conductivities of the two electrolytes is about 0.5. Therefore, 0.5 times the energy density of the capacitor with the acetonitrile based electrolyte. It is also a major advantage to increase the operating voltage for a capacity in that you can reduce the number of capacitors required in series to achieve a required voltage. Since energy is a function of the voltage the increase of the resultant voltage range is a dramatic improvement. This is both a cost reduction, and a saving in space and weight for a given application such as in a hybrid electric vehicle when using these new low toxicity, high voltage stable electrolytes.

These new higher voltage electrolytes can be used at very high molarities 1.5 to 4.5 M (concentrations) due to the higher solubilities of the selected tetraalkyl ammonium tetrafluoroborates and N,N-dialkyl pyrrolidinyl tetrafluoroborates. When the salt concentration is doubled, the electrical effectiveness and capacity of the electrolyte significantly increases. Therefore these higher voltage electrolytes which have 2 to 4 times the salt molar concentration with conductivity at 50% as the acetonitrile electrolytes should show energy densities which are equivalent to higher than the acetonitrile electrolyte capacitors at the same 2.5 V if it was a matter of the ratio of the conductivities times the relative molar concentrations of salt. Since the present electrolytes permit the higher use voltage of up to 4.5 V which means the energy density of capacitors with these new electrolytes should be twice that of capacitors containing acetonitrile based electrolyte. These electrolytes when used at high molar concentrations and voltages offer low toxicity, enhanced safety and lower capacitor cost with higher voltages, and energy densities.

It has also been found an additional positive effect in operating capacitors at the higher voltages. The carbon electrodes of the invention which are used in capacitors increase their capacity to hold charge at the higher voltages, 4.1-4.5 V, of the electrolytes. This is a non-linear effect and is in addition to all of the advantages achieved with these electrolytes.

Application is for a hybrid electric vehicle or plug-in electric vehicles when using these new low toxicity, high voltage stable electrolytes.

These new higher voltage electrolytes can be used at very high molarities 1.5 to 4.5 M (concentrations) due to the higher solubilities of the selected tetraalkyl ammonium tetrafluoroborates and N,N-dialkyl pyrrolidinyl tetrafluoroborates. When the salt concentration is doubled, the electrical effectiveness and capacity of the electrolyte significantly increases. Although the conductivity peaks and levels off, these higher voltage electrolytes which have 2 to 4 times the salt molar concentration with conductivities at about 50% of the acetonitrile electrolytes and therefore show energy densities which are equivalent to or higher than the acetonitrile electrolyte capacitors at the same 2.5 V. This appears to be a matter of the ratio of the conductivities times the relative molar concentrations of salt. Since the present electrolytes permit the higher use of operative voltages of up to 4.5 V which means the energy density of capacitors with these new electrolytes should be 2-3 times that of capacitors containing acetonitrile based electrolyte. This is a major improvement. These electrolytes when used at high molar concentrations and voltages offer low toxicity, enhanced safety and lower capacitor cost with higher voltages, and energy densities.

It has also been found an additional positive effect in operating capacitors at the higher voltages. The carbon electrodes of the invention which are used in capacitors increase their capacity 5 to 10% to hold charge (capacitance) at the higher voltages, 4.1-4.5 V, of the electrolytes. This is a non-linear effect and is in addition to all of the advantages achieved with these electrolytes.

Figure 5:
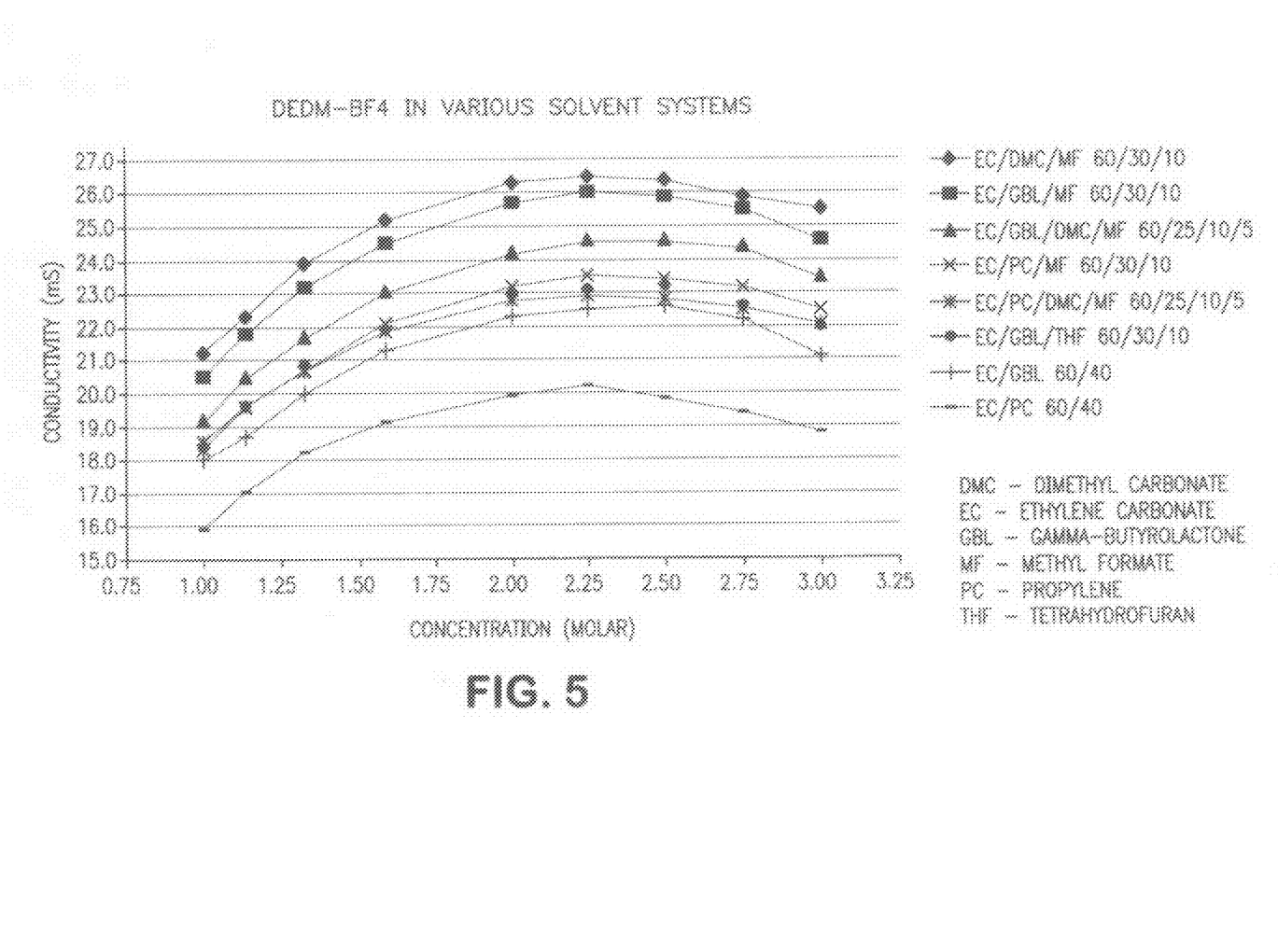
FIG. 5 is a graph showing the concentration v. conductivity of diethyl dimethyl ammonium tetrtafluoroborate in various solvent systems.

As seen in FIG. 5, N,N-diethyl dimethyl ammonium tetrafluoroborate in its highest conductivity at a concentration of about 2.0-2.50 M. The addition of methylene formate to the solvent increases the conductivity when used with the combination of ethylene carbonate and another aprotic solvent.

Figure 6:
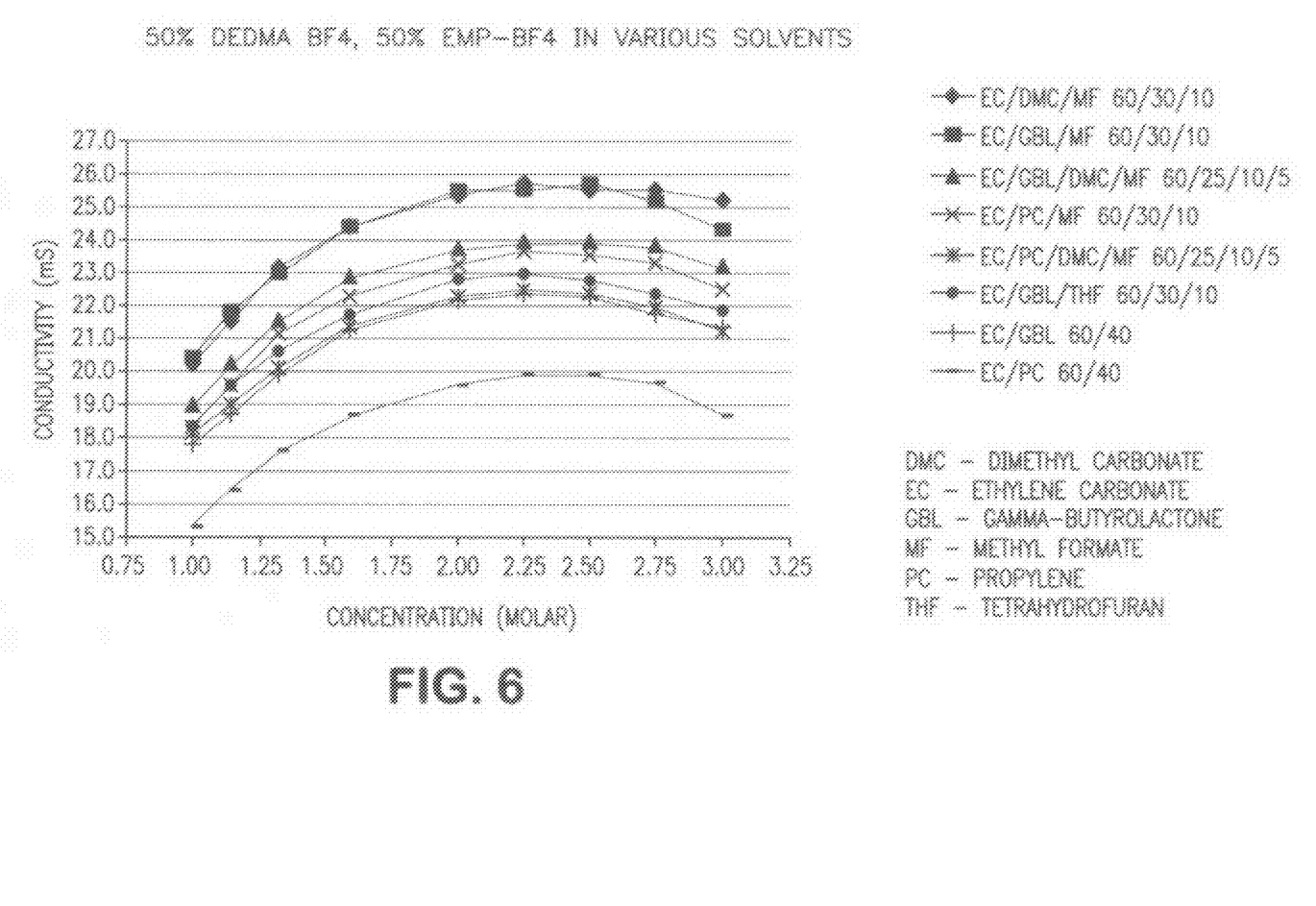
FIG. 6 is a graph showing the conductivity v. concentration of 50% diethyl dimethyl ammonium tetrafluoroborate and 50% N,N-ethylmethyl pyrrolydinyl tetrafluoroborate in various solvents.

FIG. 6 shows that 50% N,N-diethyl dimethyl ammonium tetrafluoroborate and 50% N,N-diethyl dimethylpyrrolidinyl tetrafluoroborate in different solvents, each having 60% by weight ethylene carbonate at 1.0-3.0 M maintained conductivity above 18.0 mS. The addition of methyl formate as a solvent further improved the conductivity of the electrolyte. The conductivity of the electrolyte was optimized at a concentration of about 2.00-2.75 M.

Figure 7:
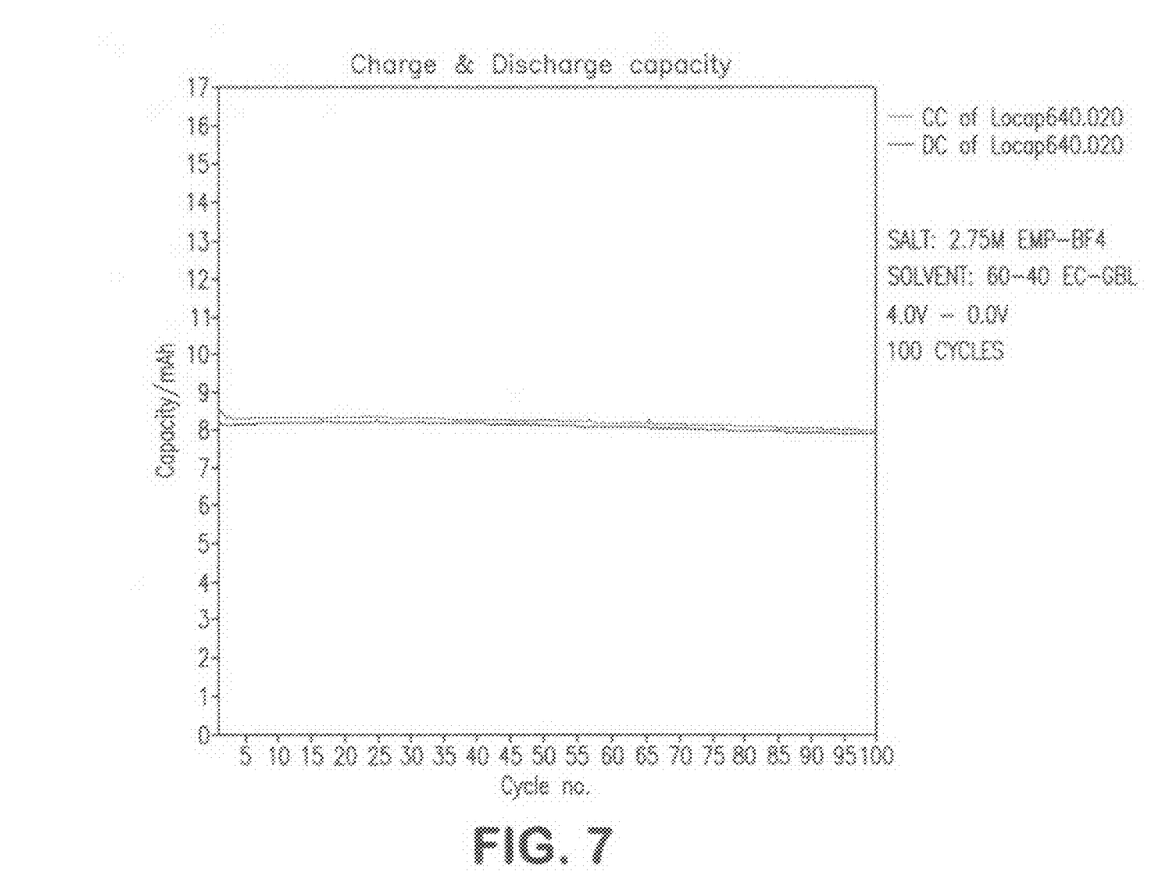
FIG. 7 shows the charge-discharge graph of 2.75 M diethyl dimethyl ammonium tetrafluoroborate in 60% EC, 30% DMC and 10% MF over 100 cycles with the electrode of the invention.

FIG. 7 shows the charge-discharge graph of 2.75 M diethyl dimethyl ammonium tetrafluoroborate in 60% EC, 40% GBL DMC over 100 cycles with the electrode of the present invention.

Figure 8:
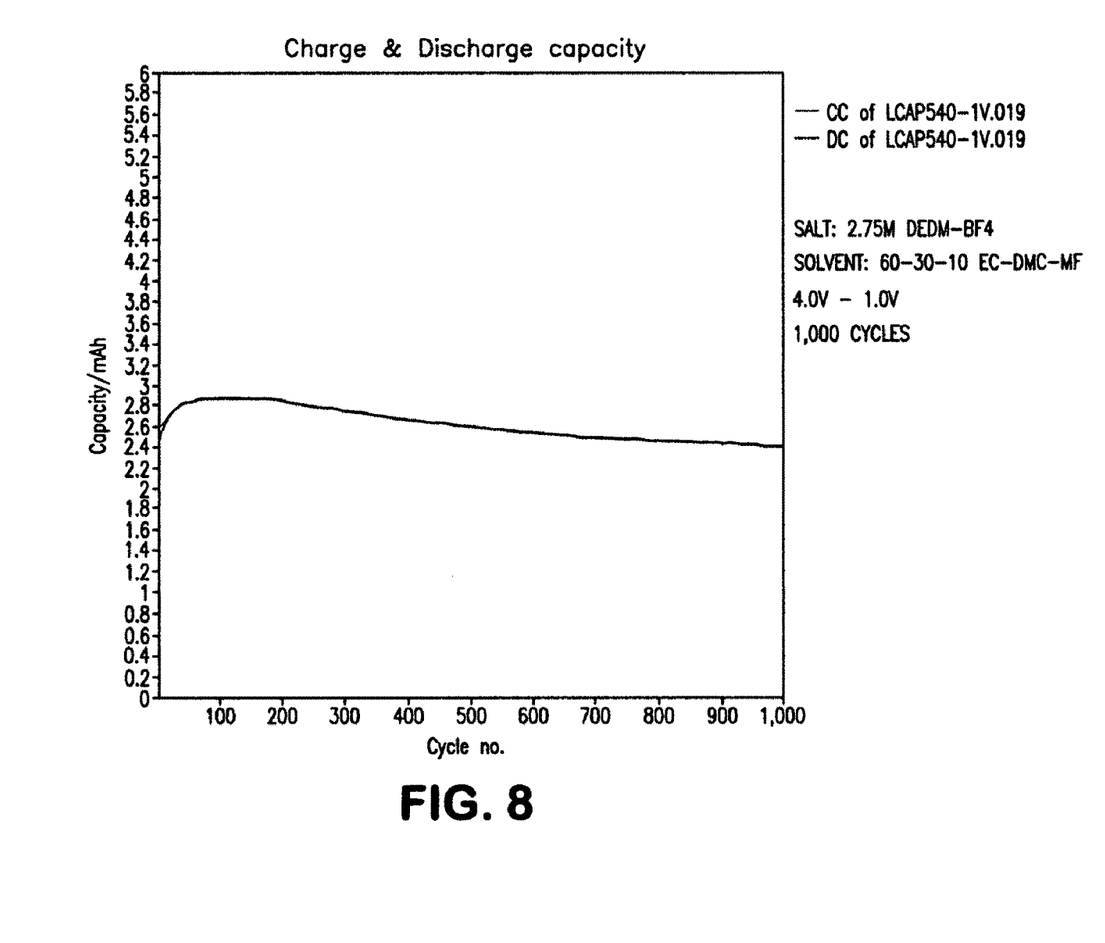
FIG. 8 shows the charge-discharge graph of 2.75 Methyl-methyl pyrrolidinyl tetrafluoroborate in 60% EC and 50% GBL t 4.0 V with the electrode of the invention.

FIG. 8 shows the charge-discharge graph of 2.75 M diethyl dimethyl ammonium tetrafluoroborate in 60% EC-40% GBL-10 MF over 100 cycles at 4.0 V with the electrode of the present invention.

An electrode to be used in the capacitor is prepared by acid washing, then heat treating the activated carbon used in the electrode between 850° C. and 1300° C. preferably 1000-1300° C. in an inert atmosphere or vacuum for about 30 to 60 minutes, forming carbon repetitive aluminum discs for the electrode and then making a capacitor with the electrode separated by a separator and adding the preferred electrolyte and testing using a voltage cycling in the range 2.5 to 4.1 V up to 2.5 to 4.8 V.

Example 1

Figure 1:
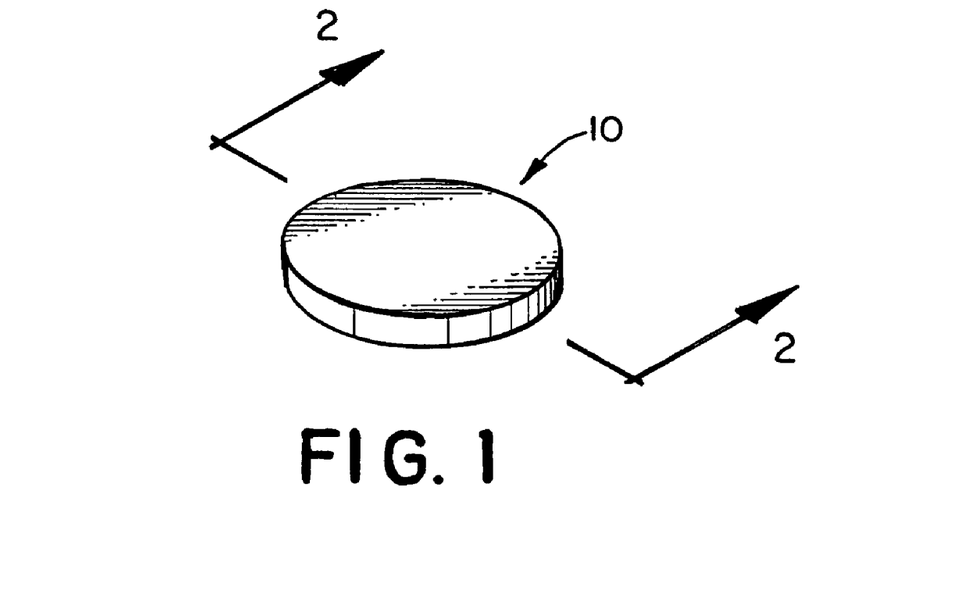
FIG. 1 is a view of one form of carbon electrode for an electrochemical double layer capacitor of the invention.
Figure 2:
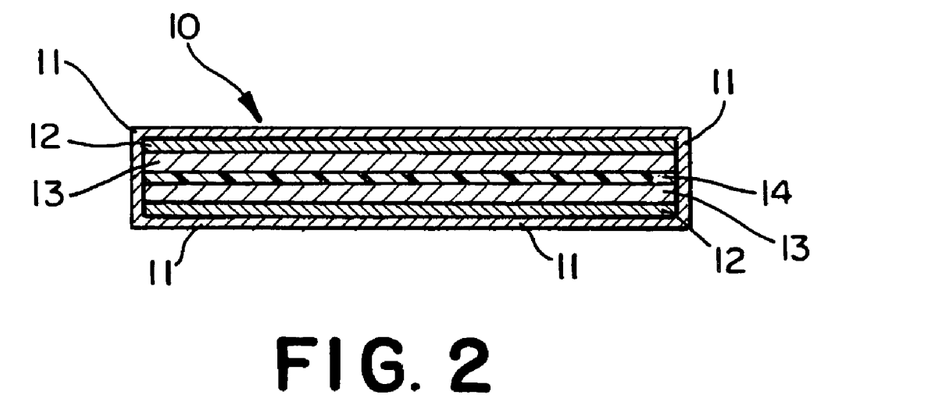
FIG. 2 is a cross-sectional view of an electrode with the disc of FIG. 1

A. As shown in FIGS. 1 and 2, one form of electrode of the invention (10) comprises an aluminum metal foil collector (11) on the top and bottom which are about 1 to 4 mils in thickness. On the collector (11) are an optional conductive carbon coatings (12) in a thickness of about 0.5 to 5 microns containing 6-12% conductive carbon. On coatings (12) are the discs (13) which comprise conditioned higher surface area conductive carbons with a binder in a thickness of about 0.5 to 5 microns. A conventional porous insulating separator (14) having a thickness of about 0.5 to 3 mils is used between the conductive carbons (13). The coatings (12) may also comprise the same treated carbon found in layers (13). Having 6 to 12% of the conductive carbon lowers the ESR.

The separator (14) can comprise any conventional inert separator used in making carbon electrodes. A preferred separator is porous Teflon. The electrodes used may be symmetrical or asymmetrical.

The discs with conductive carbon layer (13) comprise the pretreated conductive carbon prepared according to the invention in combination with an inert polymeric binder such as polytetrafluoroethane or Kynar that is present in an amount of about 6 gm/100 gm by weight. Conductive carbon can also comprise Cabot BP 2000 which is commercially available.

The disc layers (13) can be prepared by mixing about 0.02 grams of the treated carbon with about 6% of polytetrafluoroethane or Kynar in an acetone solvent, rolling back and forth the mixture under pressure to form a layer of about 0.5 to 5 microns in thickness and ⅝" circular that is die cut and vacuum dried. The particle size of the carbon particles is about 0.5-10 microns. The disc can comprise different shapes, i.e. square, rectangular, circular, etc.

Alternatively, the active carbon can be prepared by treating the carbon particles used to form the electrode disc (13) after acid ball milling to about 0.5 to 10 microns, preferably 3-6 microns and then by a heat treatment in a furnace to remove oxygen and sulfur functional groups at 850-1300° C., preferably 1100° C., followed by washing and drying under vacuum. The heat treatment steps being carried out in an inert atmosphere.

Figure 3:
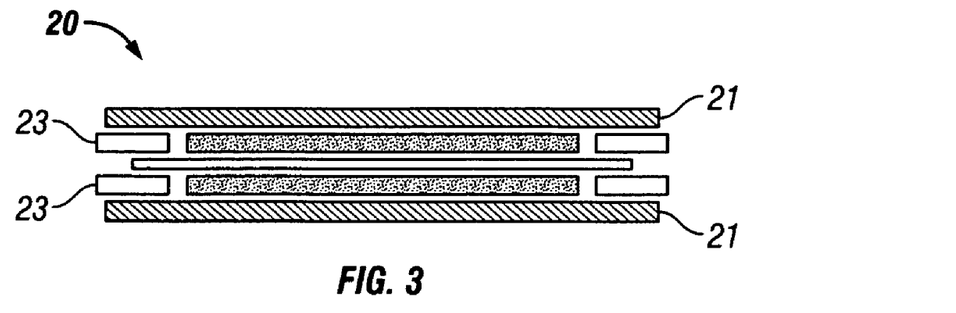
FIG. 3 is a cross-sectional view of a test cell electrode of the invention.
Figure 4:
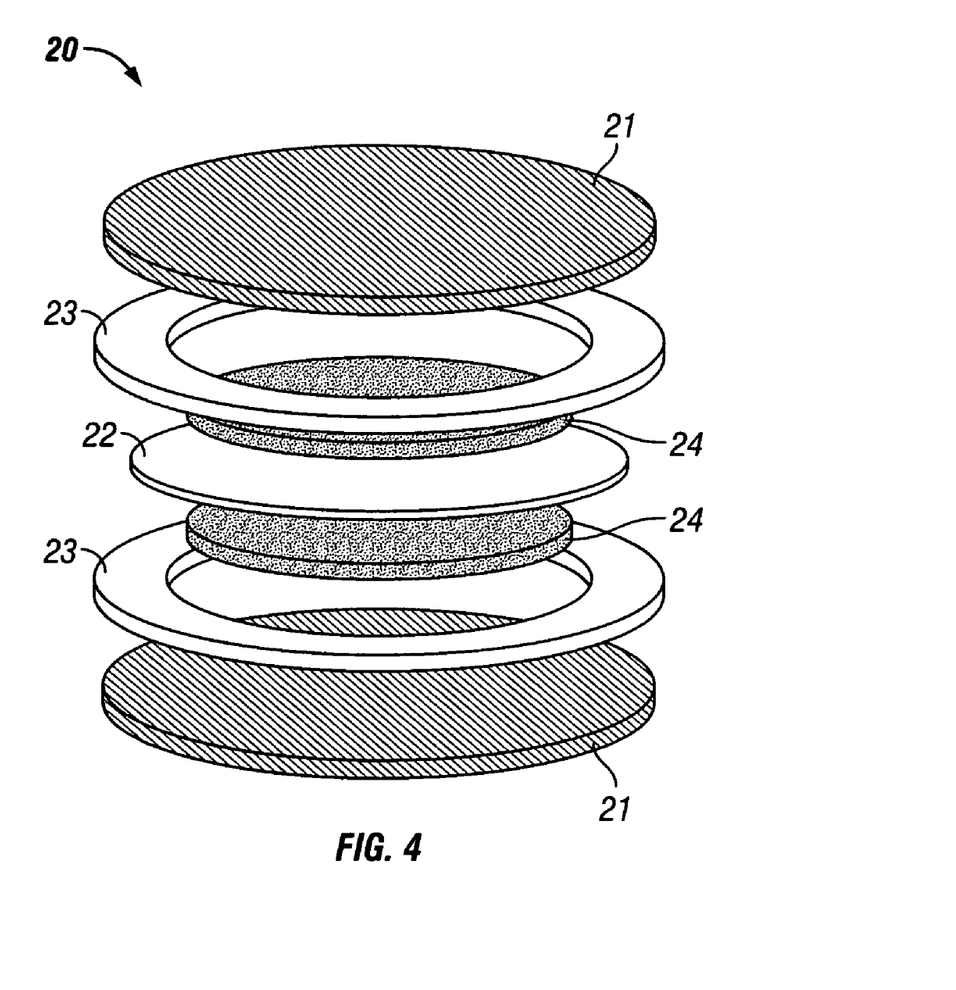
FIG. 4 is an exploded view of the electrode of FIG. 3.

B. Alternatively, a carbon electrode (20) can be prepared as seen in FIGS. 3 and 4 by preparing the end plates (21) from a sheet of aluminum coated with a thin liquid conductive carbon dispersion and then baked. One dry, proper sized discs (21) are punched from the sheet and put on a roller to flatten the edges. Surlyn® rings (23) are then heat sealed to the end plates (21). The heat treated carbon is then made into a paste with 10% Surlyn binder and acetone. The paste is rolled into a sheet of about 4 mm of Teflon sheeting. The acetone is evaporated and then punched to size to fit within the Surlyn rings. The carbon electrodes (24) are then baked under vacuum to remove any moisture. The separator (22) is a 0.5 mil thick porous Teflon disc which is slightly smaller than end plates (21) but larger than the electrodes (24). The electrodes are soaked in the proper electrolyte before assembly then placed within the Surlyn rings. The separator is centered on one Surlyn ring assembly. The other Surlyn ring assembly is then placed on top of the other assembly and the entire assembly is heat sealed together.

Example 2

Preparation of Prismatic Capacitor

Figure 4A:
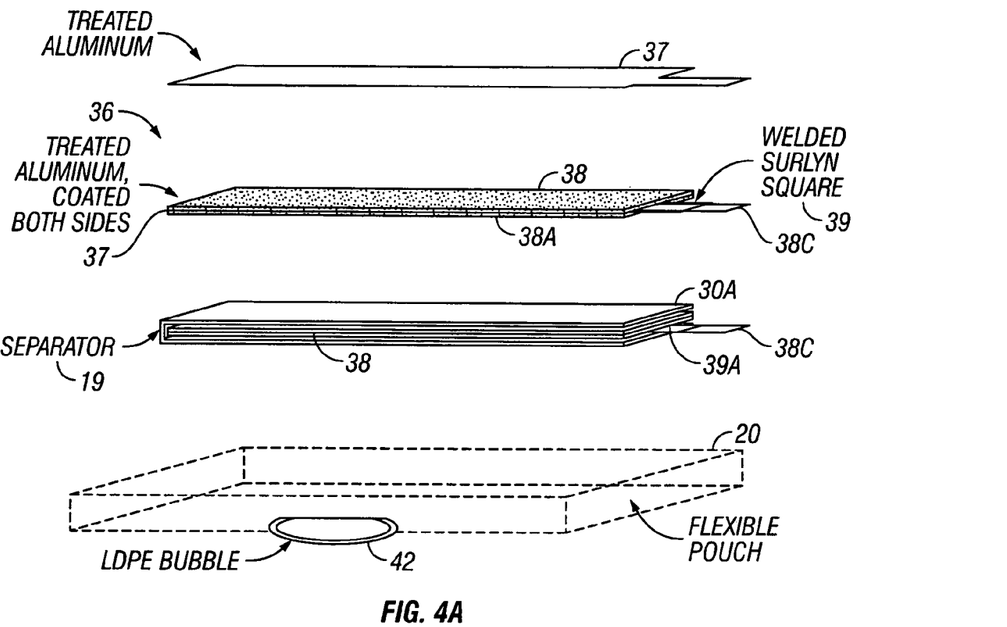
FIG. 4A is an exploded view of a prismatic capacitor assembly with carbon electrodes of the present invention.
Figure 4B:
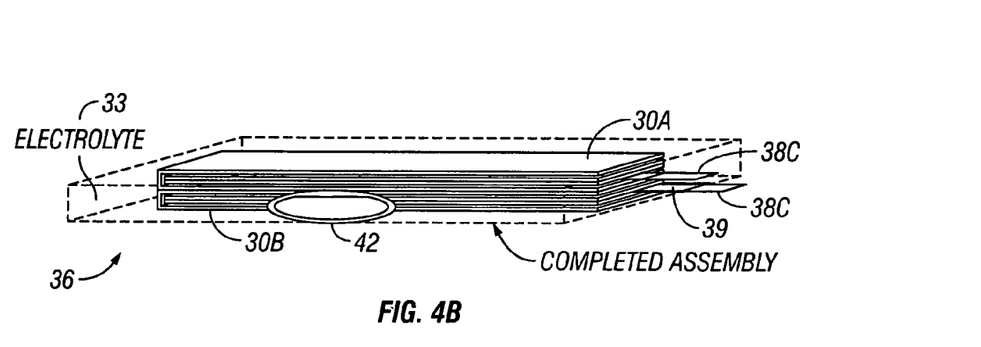
FIG. 4B is a perspective view of the capacitor of FIG. 4A assembled.

As seen in FIGS. 4A and 4B, the capacitor requires two electrodes (30A, 30B). Electrodes (30A, 30B) are made of 90% treated carbon and 10% Surlyn binder in an acetone slurry. A sheet of treated aluminum foil (37) is coated with a thin liquid conductive carbon dispersion coating (38). Once coated onto the treated aluminum sheet (37), the acetone evaporates, and then the other side (38A) of the aluminum foil (37) is coated. Once the second side (38A) has been coated, proper sized rectangles are cut from the aluminum sheet with small plain aluminum tabs (38C) still attached to one end. Once cut the electrodes are baked under vacuum to remove any residual moisture.

Once removed from the baking/vacuum treatment small squares of Surlyn are welded to the small plain aluminum tabs (38C). This allows for future secure welding to the assembled flexible foil pouch (36).

A rectangular pouch (41) is assembled from the flexible foil pouch material. A low density polyethylene (LDPE) bubble (42) is assembled and then attached to the side of the flexible foil pouch (41). The bubble (42) consists of two disks of LDPE sandwiched around a thin disk of Teflon. This assembly is then welded to the side of the flexible foil pouch (41). This bubble allows for gas generated from the cycling process to be contained while alleviating a buildup of pressure within the cell.

The capacitor uses a specially treated 1.0 mil paper separator (19) that wraps around each electrode. As seen in FIG. 4B, one separator-wrapped electrode is placed on another with the tabs on alternating sides. This paid of electrodes is then welded into the assembled pouch via the Surlyn squares previously welded to the plain aluminum tabs.

The electrodes are soaked in the proper electrolyte (35) within the pouch (36). The pouch (36) is sealed but for a small selection into which the electrolyte (35) can be placed. The electrodes are de-gassed under vacuum, and then the pouch (36) is completely sealed.

Example 3

Preparation of Test Cell Electrodes

The carbon electrodes can be seen in FIG. 3 are prepared by forming an acetone slurry of 10% Kynar® resin and 90% carbon (0.5-1 micron) which has been treated to remove ash and silica and heated to 1100° C. to 1 in under inert atmosphere. The mixture is cast onto a flat Teflon sheet and then the acetone is allowed to evaporate. The dried sheet is removed from the Teflon and ⅝" circular electrodes are die cut and vacuum dried. The electrodes weigh about 0.01 gram and are 4 mil in thickness.

A carbon electrode (20) can be prepared as seen in FIGS. 3 and 4 by preparing the end plates (21) from a sheet of aluminum coated with a thin liquid conductive carbon dispersion and then baked. Once dried, proper sized discs (21) are punched from the sheet and put on a roller to flatten the edges. Surlyn® rings (23) are then heat sealed to the end plates (21). The heat treated carbon is then made into a paste with 10% Surlyn binder and acetone. The paste is rolled into a sheet of about 4 mm of Teflon sheeting. The acetone is evaporated and then punched to size to fit within the Surlyn rings. The carbon electrodes (24) are then baked under vacuum to remove any moisture. The separator (22) is a 0.5 mil thick porous Teflon disc which is slightly smaller than end plates (21) but larger than the electrodes (24). The electrodes (24) are soaked in the proper electrolyte before assembly then placed within the Surlyn rings. The separator is centered on one Surlyn ring assembly. The other Surlyn ring assembly is then placed on top of the other assembly and the entire assembly is heat sealed together.

Example 4

Comparison of Capacitor Test Cells with DEDMABF$_4$ in EC/GBL Electrolyte Using Post-Treated OSAKA PC Carbon Electrode (0.008 g)

| CONCENTRATION OF ELECTROLYTE DEDM-BF4, EC-GBL | ESR | LEAKAGE EIS | CAPACITANCE (FARADS) | RELATIVE MACCOR ENERGY mAh |
|---|---|---|---|---|
| 1.00 M, 1100° C. (Carbon Treatment) | 1.5 | VG none | 0.29 (2.0 V) 0.30 (3.0 V) 0.32 (4.2 V) | 0.09 0.13 0.24 |
| 2.50 M, 1000° C. | 1.8 | VG none | 0.29 (2.0 V) 0.30 (3.0 V) 0.32 (4.2 V) | 0.09 0.13 0.24 |
| 2.50 M, 1100° C. | 1.4 | VG none | 0.37 (2.0 V) 0.38 (3.0 V) 0.38 (4.2 V) | 0.09 0.13 0.29 |
| 3.25 M, 1100° C. | 1.4 | VG none | 0.37 (2.0 V) 0.38 (3.0 V) 0.38 (4.2 V) | 0.12 0.15 0.31 |

The greater molarity results in improved energy

Example 5

Comparison of Capacitor Test Cells with DEDMABF4 in 50/50 EC/PC Electrolyte Using Post-Treated Norit 30 Carbon (0.008 g)

| CONCENTRATION OF ELECTROLYTE DEDM-BF4, EC-PC | ESR | LEAKAGE EIS | CAPACITANCE (FARADS) | RELATIVE MACCOR ENERGY (100 cycles) mAh |
|---|---|---|---|---|
| 1.00 M | 0.65 | VG none | 0.50 (2.0 V) 0.69 (4.1 V) | NA 0.29 |
| 1.5 M | 0.67 | VG none | 0.56 (2.0 V) 0.72 (4.1 V) | NA 0.35 |
| 2.0 M | 0.64 | VG none | 0.37 (2.0 V) 0.84 (4.1 V) | NA 0.34 |
| 3.0 M | 0.52 | VG none | 0.72 (4.1 V) | 0.36 |

The greater molarity results in improved energy

Example 6

Preparation of the Aluminum Collector

The preferred metal collector used in the electrode is made from plain annealed aluminum foil with a coating of a water based conductive carbon acrylic coating such as a commercial Acheson's carbon acrylic conductive coating which is then baked on at 200° C. The aluminum is suitable for the positive or negative electrode.

The post treated activated carbon or Cabot BP 2000 may be formulated with Kynar® and coated directly on the aluminum collector foil in a 3-8 mil thick electrode layer. This can be on one or both sides. It is understood that other metallic collectors may be used.

Example 7

Preparation of the Preferred Electrolyte

A preferred solvent comprises the combination of ethylene carbonate (EC) and one or more of the group gamma butyrolactone (GBL), propylene carbonate or dimethyl carbonate wherein ethylene carbonate comprises at least 20% by weight, preferably 40 to 60% by weight.

The salt concentration is at least 1.0M, preferably 1.5 to 5.2M most preferred range is 1.5-3.5M. A mixture with Spiro or bis-pyrrolidinyl ammonium tetrafluoroborate also provides good low temperature efficiency.

These improvements are seen more significant for those electrolytes when the ionic salt content is more than 2.5 to 4.0 M and twice as much as the current electrolytes which results in even better efficiency in charge/discharge capacitance than implied from the conductivity values alone.

What is claimed is:

1. An electrochemical device which comprises the combination of at least one carbon electrode comprising;
   a) a metal collector on the top and bottom surfaces;
   b) optionally, a first conductive carbon layer on each of the top and bottom interior surfaces of the collectors;
   c) a porous second conductive carbon layer on each of said first conductive carbon layers, said second conductive carbon layers being substantially free of oxygen and heteroatoms containing functional groups;
   d) a porous inert separator between said second conductive carbon layers; and
   e) an electrolyte which comprises at least one conductive salt selected from the group consisting of a compound of the general formula:

wherein $R_1$, $R_2$, $R_3$ and $R_4$ are the same or different and consisting of an alkyl group having 1 to 4 carbon atoms, $R_5$ and $R_6$ are hydrogen or methyl and a solvent free of a nitrile solvent comprising ethylene carbonate and a member of the group consisting of propylene carbonate, dimethyl carbonate, gamma butyrolactone, 1,2-dimethoxy ethane, and triethylene glycol dimethyl ether, said salt being in a concentration of 1.5 to 4.5 M and said solvent comprising about 10 to 70% by weight of ethylene carbonate whereby there is a eutectic mixture of the solvents and/or the solvents and the salt.

2. The electrochemical device of claim 1 wherein the salt concentration of the electrolyte is 2.0 to 4.8 M.

3. The electrochemical device of claim 1 wherein the electrode is an aluminum metal collector.

4. The electrochemical device of claim 1 wherein the electrolyte solvent comprises two members selected from the group consisting of ethylene carbonate, propylene carbonate, gamma butyrolactone and dimethyl carbonate.

5. The electrochemical device of claim 1 including up to 10% by weight of a solvent selected from the group consisting of methyl acetate, ethyl acetate, acetone, and methyl formate in said electrolyte.

6. The electrochemical device of claim 1 wherein the conductive salt of said electrolyte is a tetraalkyl ammonium tetrafluoroborate selected from the group consisting of methyltriethyl ammonium tetrafluoroborate, diethyldimethylammonium tetrafluoroborate, and ethyltrimethylammonium tetrafluoroborate and tetraethylammonium tetrafluoroborate.

7. The electrochemical device of claim 1 wherein the conductive salt of said electrolyte is selected from the group consisting of N,N-ethylmethyl pyrrolidinyl tetrafluoroborate, N,N-dimethyl pyrrolidinyl tetrafluoroborate, N,N-dimethyl-2-methylpyrrolidinyl tetrafluoroborate, and N,N-dimethyl-3-methylpyrrolidinyl tetrafluoroborate.

8. The electrochemical device of 1 wherein the solvent of said electrolyte consists essentially of ethylene carbonate and a member selected from the group consisting of propylene carbonate, gamma butyrolactone.

9. The electrochemical device of claim 1 wherein the conductive salt said electrolyte is spiro pyrrolidinyl pyrrolidinyl tetrafluoroborate.

10. The electrochemical device of claim 1 wherein said carbon in the electrode was heat treated to remove oxygen, nitrogen and sulfur functional groups and silica by heating at a temperature between 850 and 1300° C., in an inert atmosphere and comprises 6 to 12 g of conductive carbon per 100 g of carbon.

11. The electrochemical device of claim 1 which is a capacitor.

12. The electrochemical device of claim 11 in which the electrolyte for the electrode comprise a conductive tetraammonium salt of the formula:

$R, R_1, R_2, R_3, N\ B\ F_4$ wherein R, $R_1$, $R_2$, $R_3$ are ethyl or methyl groups or together R, $R_1$, $R_2$ and $R_3$ are one or two pyrrolidinyl groups in an aprotic solvent.

13. The electrochemical device of claim 11 wherein the electrolyte solvent is at least two members of the group consisting of ethylene carbonate, propylene carbonate dimethyl carbonate and gamma butyrolactone.

14. The electrochemical device of claim 11 wherein the salt concentration of the electrolyte is about 1.5 to 4.8 M.

15. The electrochemical device of claim 11 wherein the electrolyte solvent comprises about 40-60% ethylene carbonate.

16. The electrochemical device of claim 11 which comprises an annealed aluminum collector.

17. The electrochemical device of claim 11 wherein said carbon in the electrode is acid washed prior to heat treatment to remove ash and salts.

* * * * *